No. 820,436. PATENTED MAY 15, 1906.
T. PATTERSON.
CLAMPING ELBOW FOR TUBULAR FARM GATES.
APPLICATION FILED JUNE 23, 1905.
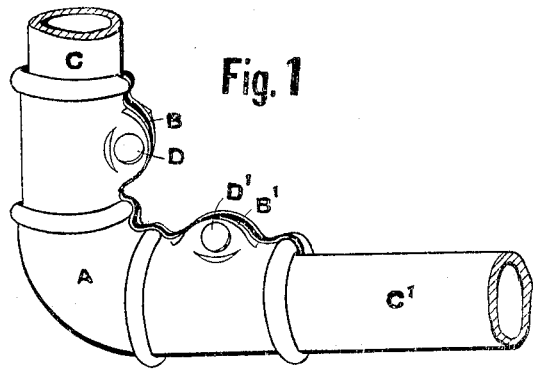
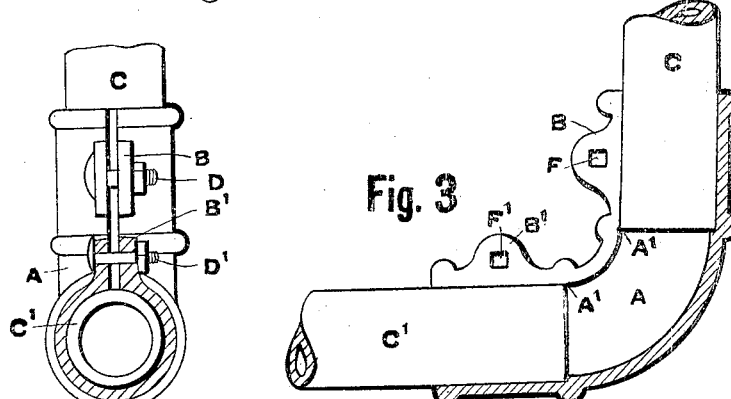
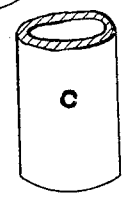
Witnesses.
Gerald S. Roxburgh
W. J. Smither
Inventor.
Thomas Patterson

UNITED STATES PATENT OFFICE.

THOMAS PATTERSON, OF TORONTO JUNCTION, CANADA.

CLAMPING-ELBOW FOR TUBULAR FARM-GATES.

No. 820,436.     Specification of Letters Patent.     Patented May 15, 1906.

Application filed June 23, 1905. Serial No. 266,656.

*To all whom it may concern:*

Be it known that I, THOMAS PATTERSON, mechanical engineer, of the town of Toronto Junction, in the county of York, in the Province of Ontario, Canada, have invented certain new and useful Improvements in Clamping-Elbows for Tubular Farm-Gates and the Like, of which the following is a specification.

My invention relates to improvements in clamping-elbows for converging pipes, rods, and the like; and the object of the invention is to devise a simple, strong, durable, and efficient means whereby the converging ends of pipes or rods at the corner of frames of gates or the like may be quickly and securely clamped together, thereby reducing labor and dispensing with the necessity of pipe and elbow threading and at the same time giving an ornamental appearance to the gate; and it consists, essentially, in a hollow tubular elbow, longitudinally divided, designed, preferably, to be clamped together by bolts or the like to securely grasp the ends of the two converging pipes or rods, as hereinafter more particularly explained.

Figure 1 is a perspective view of the clamping-elbow as applied to two converging pipes. Fig. 2 is a cross-section of the elbow and pipe. Fig. 3 is a longitudinal section in a plane with the slot in the elbow. Fig. 4 is a perspective view of the clamping-elbow with pipes withdrawn.

In the drawings like letters of reference indicate corresponding parts in each figure.

A is my clamping-elbow having a longitudinal slot, preferably on the inside, with lugs B B', having, preferably, square holes F F', through which are inserted the bolts D D', by means of which the elbow is clamped securely to the two converging ends C and C' of pipes, as and for the purpose specified. The elbow is suitably reinforced and is provided with internal shoulders A', against which the ends of the pipe are designed to abut.

What I claim as my invention is—

1. A clamping-elbow having a longitudinal slot therein, an internal shoulder against which the pipes are designed to abut and lugs formed on each side of the slot opposite the enlarged ends of the elbow and bolts extending through such lugs as specified.

2. A clamping-elbow having a longitudinal slot therein and internal shoulders against which the pipes are designed to abut, as and for the purpose specified.

THOMAS PATTERSON.

Witnesses:
   GERALD S. ROXBURGH,
   B. BOYD.